July 28, 1953 — A. W. KLOMP — 2,646,724
METHOD FOR GENERATING GEARS
Filed July 27, 1946 — 2 Sheets-Sheet 1
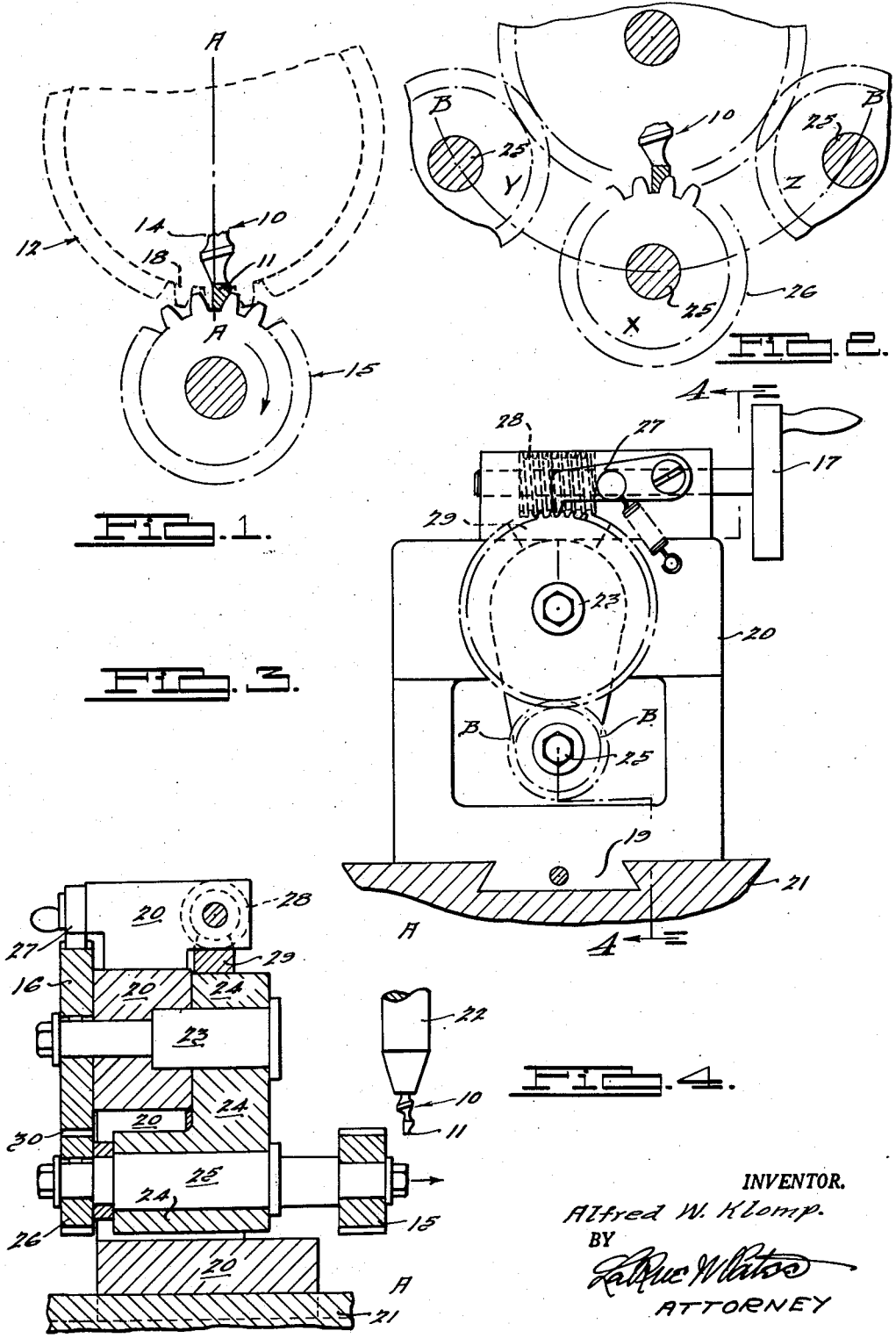
INVENTOR.
Alfred W. Klomp.
BY
ATTORNEY July 28, 1953    A. W. KLOMP    2,646,724
METHOD FOR GENERATING GEARS
Filed July 27, 1946    2 Sheets-Sheet 2
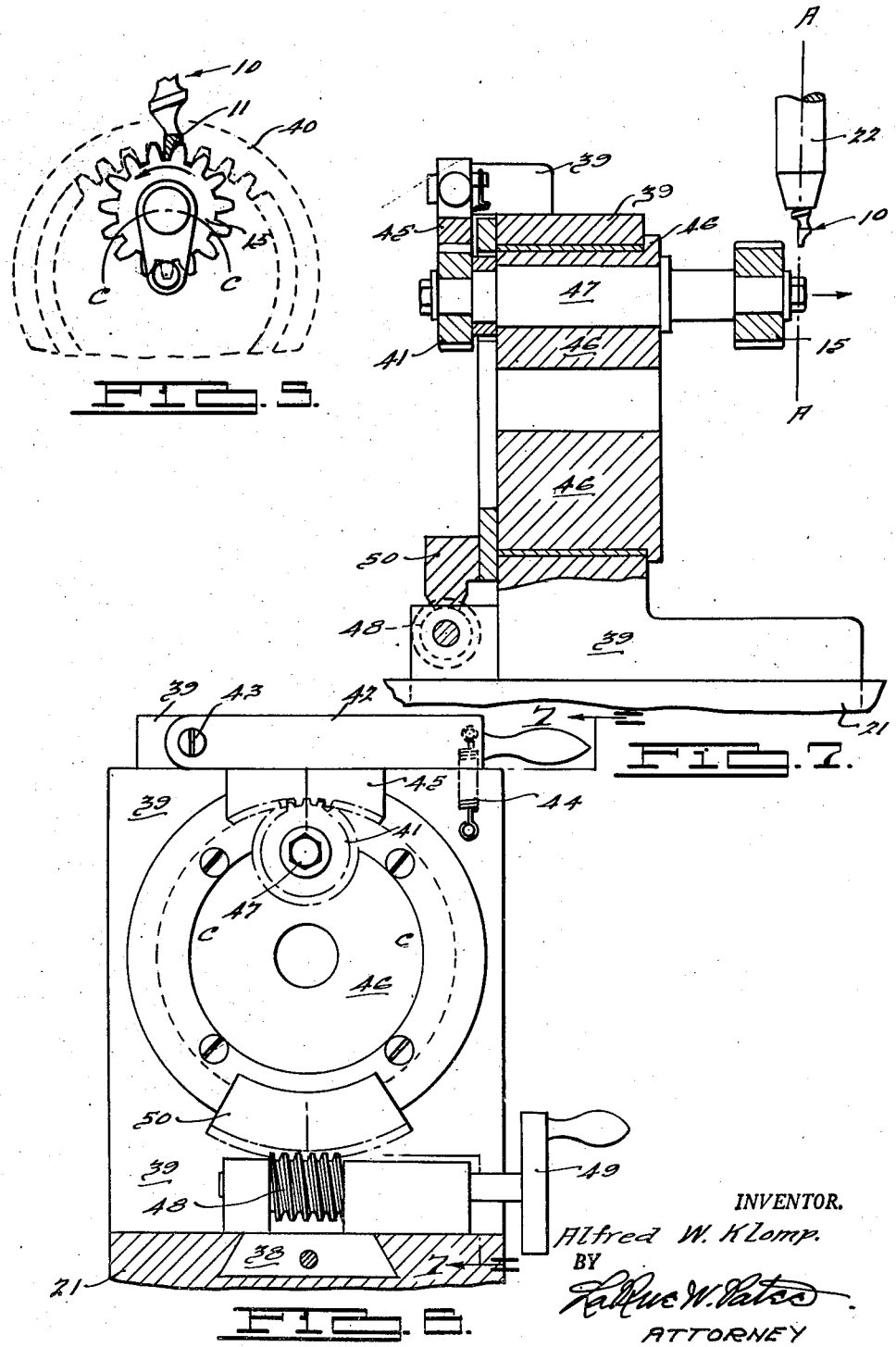
INVENTOR.
Alfred W. Klomp.
BY
LaRue W. Yates
ATTORNEY

Patented July 28, 1953

2,646,724

UNITED STATES PATENT OFFICE 2,646,724

METHOD FOR GENERATING GEARS

Alfred W. Klomp, Detroit, Mich., assignor to Process Gear and Machine Co., Detroit, Mich.

Application July 27, 1946, Serial No. 686,772

2 Claims. (Cl. 90—3)

This invention relates generally to the art of gears, sprockets, shapes and tooth members such as splines, etc., and in particular to a new, novel and useful tool for cutting gears and the like, and the method of using same to generate teeth and shapes.

An important feature of the invention is that the cutting face of the tool is approximately equal to a half gear tooth in cross-section. In other words, when a gear tooth is split longitudinally on its center line, the cutting face of the tool has the same configuration in cross section as each of the halves with the cutting edge of the cutting face outlining a half tooth.

The cutting face is so positioned on the tool that the line of the cutting face corresponding to the longtudinal center line of a gear tooth, is positioned on the longitudinal axis of rotation of the tool, so that when the tool rotates, the cutting face will pivot about the longitudinal center line or axis of the tool thereby describing a cutting circle which equals a whole gear tooth in cross section.

The shank portion of the tool is formed by the cutting face ascending about the longitudinal center line of the tool in a cylindrical helix with a shoulder on the face portion providing an area on the shank of the tool for holding and gripping same in a chuck or holder. The helix allows the tool to be ground back and sharpened without changing the configuration of the cutting face.

Another important part of the invention is that the tool in cutting or forming a gear, shape, or toothed object, "generates" the tooth or shape on the object or blank. By the term "generate" is meant that the shape cut or formed is not the complement of the shape of the cutting face of the tool or of the cutting circle of the tool, but rather that the shape formed is conjugate to the cutting edge or circle of the tool at an infinite number of points during the cutting operation. In other words, the tool in this invention "generates" the tooth or shape on the workpiece or blank by cutting conjugate to the workpiece at an infinite number of points with the conjugate points outlining the desired tooth shape. It is in this sense that the term generate is used.

A very important part of the invention is the fact that the method of generating a shape or tooth introduces a gear to gear relationship between the tool and the blank or workpiece. This means that while the workpiece is being fed into the cutting circle of the tool, the workpiece and/or the tool are describing movements relative to one another identical to conjugate gears in working relation, which action is more fully described hereinafter.

An object of the invention is to provide a gear cutting or generating tool with a cutting face or edge approximately equal in cross section to one-half a conjugate gear tooth.

Another object is to provide a tool and a method of using same wherein the tool will generate the tooth form.

Another object is to provide a gear cutting or generating tool, which, in operation, describes a cutting circle approximately equal in cross section to a whole conjugate gear tooth.

Another object of the invention is to disclose a method of using the tool so that, when the tool is used, it acts as a mating gear tooth to the gear which is being generated.

Another object is to provide a tool with a cutting face ascending in a helix about the longitudinal axis of the tool, about which axis, the tool is rotated in operation.

A further object is to provide means for using the tool to generate shapes, teeth and gears.

A further object is to provide a gear cutting or generating tool that has a cutting face capable of retaining its form and dimension when worn or ground back along the helical shank.

A further object is to provide a gear cutting or generating tool that can be used and sharpened until it is consumed thereby eliminating waste in high speed steel.

Other objects and advantages will be apparent from the following description and the attached drawings, in which:

Fig. 1 is an elevational view of the tool, in cutting relation with a gear blank showing the tool's cutting face or area conforming to the shape of a gear tooth which is conjugate to the tooth or gear being generated;

Fig. 2 is a diagrammatic illustration of the relation between the tool and the workpiece when using the tool according to the method described to generate teeth on the workpiece;

Fig. 3 is an elevational end view of a mechanism employed in operating the tool and the workpiece in generating cylindrical gears;

Fig. 4 is a cross sectional view of Fig. 3 taken on the line 4—4 thereof;

Fig. 5 is an elevational view of the tool rising out of a mating ring gear and in cutting relation with a pinion gear showing the tool's cutting face conforming to the configuration of one-half the cross section of the mating internal ring gear tooth;

Fig. 6 is an end elevational view of a mechanism employed in using the tool to generate gears; and Fig. 7 is a cross sectional view of Fig. 6 taken on the line 7—7 thereof.

Gear teeth, to be useful, must transmit power from a driving shaft to a driven shaft evenly and with a minimum of friction and interference and to accomplish this purpose several systems of teeth have been developed among which are the cycloidal, segmental, involute and parabolic.

The involute system is herein referred to for purposes of explanation and illustration as this system embodies the simplest and best tooth curve actually and theoretically as well as being one of the greatest practical use in gearing. However, it is not intended to limit the use of the invention to this one system as the invention is adaptable to other systems as well. This is fully described hereinafter and is also described in my co-pending applications, Serial Numbers 651,601, now Patent No. 2,620,549 granted December 9, 1952 and 672,002, now abandoned.

Referring to Fig. 1, tool 10 is equipped with cutting face 11 which is approximately equal in cross section to a half tooth of imaginary gear 12. The tool 10 revolves about its longitudinal axis A—A which causes cutting face 11 to pivot about the axis A—A which creates a cutting circle which is the equivalent of a whole tooth of the imaginary gear 12. The tool 10 is formed by the cutting face 11 ascending about the longitudinal axis A—A in a helix with the shoulder portion 14 providing an area for gripping the tool in a holder or collet.

The tool 10, Fig. 1, is shown rising out of an imaginary gear 12 in mating gear relation with or conjugate to gear blank 15 which is in cutting relation with the tool 10. When the tool 10 is rotated about the axis A—A the cutting face 11 of the tool 10 occupies the area of a whole tooth of the imaginary conjugate gear 12 and generates on the blank 15 teeth that will mate with the imaginary conjugate gear 12. In generating the teeth on the blank 15, the tool 10 is stationary and rotates about the axis A—A while the blank 15 moves in working relation therewith by moving through the positions X, Y and Z, Fig. 2, and an infinite number of positions therebetween on the arc B—B.

Relative to the mechanism for accomplishing this action, support member 20, Figs. 3 and 4, is slidably mounted by means of slide 19 on table 21 for feeding the blank into the cutting area or circle of the tool 10 as held in and rotated by holder 22. Spindle 23 is journaled in member 20 with supporting arm member 24 and master spur gear 16 rotatably bearinged on either end thereof. Spindle 25 is journaled in the arm member 24 with master spur gear 26 and the gear blank 15 positioned on either end thereof and held against rotation by conventional means, not shown. Indexing dog 27 attached to member 20 holds the master gear 16 against rotation so that when worm 28, attached to the member 20 and sector 29 mounted on the member 24, are operated by crank 17, the arm 24 swings on the spindle 23 in an arc B—B carrying the spindle 25 and the gear 26 and the blank 15 therewith. As the master gear 16 is stationary, rotary movement is imparted to the gear 26 as it moves through positions X, Y and Z in the arc B—B and the positions therebetween, and, as the gear 26 and the blank 15 are secured against rotation relative to the spindle 25, the blank 15 has the same arcuate and rotary movement as the gear 26 and swings in the arc B—B and occupies the positions X, Y and Z and an infinite number of positions therebetween as does the gear 26.

The tool 10 and the holder 22 are positioned so that the cutting face 11, as it is rotated by the holder 22, creates a cutting circle or area the equivalent of the cross section of tooth 18 of the imaginary conjugate gear 12.

In operation, a blank 15 is secured to the spindle 25, the holder 22 is powered and the blank 15 is fed into the cutting area of the tool 10 by means of the slide 19 with the dog 27 holding the gear 16 against rotation. The crank 17 is then operated first in one direction and then in a reverse direction which causes the arm 24, spindle 25, gear 26 and blank 15 to move in the arc B—B, and, as the gear 16 is stationary, rotary movement is imparted to the blank 15 by the spindle 25, as hereinbefore set forth. The feed of the slide 19 and the crank 17 are preferably operated simultaneously, however, one or the other may be performed separately. To advance the blank one tooth, the indexing dog 27 is disengaged from the gear 16 and the gear 26 is advanced, which action also advances the blank 15.

The relation between the gear 26 and the gear blank 15, relative to advancing the gear blank 15, necessitates that the gear 26 have either the same number of teeth as will be generated on the blank 15 or a number of teeth that is a multiple of the number of teeth that will be generated in the gear blank 15. It follows, that, if these numbers are the same, the blank 15 will be advanced one tooth when the gear 26 is advanced one tooth. Also, that, if these numbers are not the same, then the gear blank 15 will be advanced one tooth when the gear 26 is advanced the multiple number of teeth. However, the ratio between the gear 26 and the gear 16 must be taken into consideration as the indexing dog 27 secures the gears 26 and 16 relative to the gear blank 15 by allowing the gear 16 to rotate for the proper adjustment and by securing the gear 16 against rotation with the proper adjustment also thereby secured. It is thought that anyone skilled in the art of gearing can readily determine the relations and ratios, and, if necessary, the multiples hereinbefore mentioned.

Referring to Fig. 5, the tool 10 has a cutting face with the configuration of approximately a half tooth of an imaginary conjugate internal ring gear 40 with gear blank 15 describing the arc C—C as it operates in conjunction with the imaginary conjugate ring gear 40, which arc C—C is the inverse of the arc B—B hereinbefore set forth.

Relative to Fig. 5, and referring to the mechanism for generating gears, support member 39, Figs. 6 and 7, is slidably mounted on table 21 by means of slide 38 with sector 45 connected thereto by means of arm 42 which is pivotally mounted at 43 to the member 39 and is held in position by spring 44. The sector 45 is a portion of a master ring gear and meshes with pinion gear 41 which is carried by spindle 47 which is journaled in rotary member 46, which is, in turn, journaled in support member 39. The gear blank 15 is mounted on the opposite end of the spindle 47 from the master gear 41. Worm 48 is positioned on support member 39 and is operated by crank 49 and co-acts with sector 50 which is attached to rotary member 46. The sector 50 bears no relation to the sector 45 or the imaginary ring gear 40 and is used only for co-acting with the worm 48 to move the rotary member 46 and the members carried thereon through the arc C—C. The tool 10 and the holder 22 are so positioned that when the tool is rotated, it will describe a cutting circle approximately equal in axial cross section to a tooth on the imaginary conjugate ring gear 49.

In operation, the blank 15 is fed into the path of the tool 10 by means of the slide 38 while the crank 49 is turned in one direction and then turned in the opposite direction which causes the sector 50 to move back and forth across the worm 48 which causes the rotary member 46 upon which the sector 50 is secured to rotate in one direction and then rotate is a reverse direction thereby causing the spindle 47 to travel back and forth in the arc C—C.

As the pinion gear 41 is mounted on the spindle 47 and secured against rotation, it also travels in the arc C—C, and, as it is meshed in working relation with the sector 45, such movement imparts a rotary movement to the gear 41 and the spindle 47, and, as the blank 15 is mounted on the other end of the spindle 47 and secured against rotation, the blank has the same movement and motion as the gear 41.

To advance the blank 15 one tooth, the sector 45 is disengaged from the gear 41 and the gear 41 is advanced. This is accomplished by means of the spring 44 which allows the disengagement of the ring gear sector 45 and pinion 41. The relations, ratios and, if necessary, multiples in this instance are determined the same as previously described relative to Figs. 3 and 4.

The tool 10 generates the teeth in the blank 15 by cutting out the area of the blank between the teeth thereof and the blank is advanced as hereinbefore described until a complete gear is generated out of the blank 15.

The action of the mechanisms described can be reversed with the tool 10 moving in the arc B—B or C—C and with the blank 15 remaining stationary but rocking or rotating about its axis during the cutting operation, or, both the tool and the blank can move in synchronized relation in appropriate arcs without departing from the invention.

Various other adaptations, changes, substitutions, omissions and additions can be made to the invention without departing from the spirit thereof as the invention is limited only by the scope of the appended claims.

I claim:

1. The method of generating a gear which consists in the steps of rotating a cutting face about an axis which intersects and is perpendicular to the axis of the blank gear, moving the blank in an arc so that its axis moves toward and away from the intersection of the cutting face axis and the blank axis, moving the axis of the blank toward and away from the cutting face to perform the cutting operation, and indexing the blank.

2. The method of generating a gear which consists in the steps of rotating a cutting face about an axis which intersects the axis of the gear blank and which is normally at right angles thereto, moving the gear blank longitudinally of its axis into and out of cutting relation to the cutting face and swinging the axis of the gear blank toward and away from the cutting face, and indexing the blank.

ALFRED W. KLOMP.

References Cited in the file of this patent

UNITED STATES PATENTS

| Number | Name | Date |
| --- | --- | --- |
| 49,881 | James | Sept. 12, 1865 |
| 1,633,051 | Trbojevich | June 21, 1927 |
| 2,126,990 | Graves | Aug. 16, 1938 |
| 2,286,709 | Barcus | June 16, 1942 |
| 2,327,296 | Wildhaber | Aug. 17, 1943 |
| 2,367,841 | Monroe | Jan. 23, 1945 |
| 2,371,770 | Miller | Mar. 20, 1945 |
| 2,377,329 | Dettmer | June 5, 1945 |